Jan. 8, 1963  J. J. GILBERT  3,072,426
SWIVEL UNIT HAVING SPLIT BALL
Filed Sept. 30, 1960
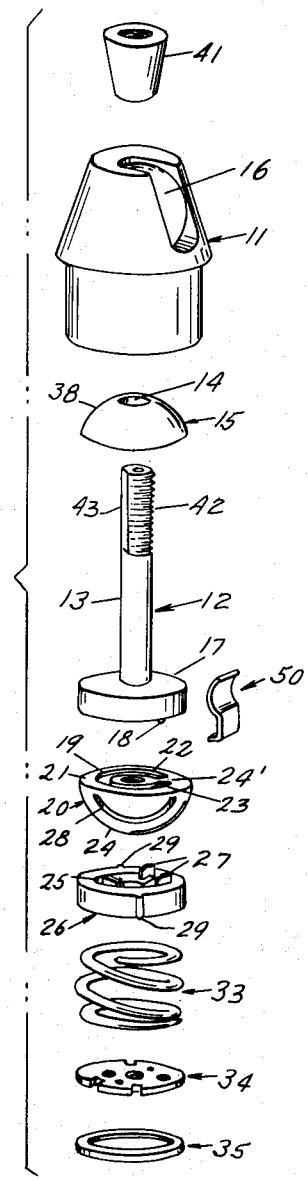
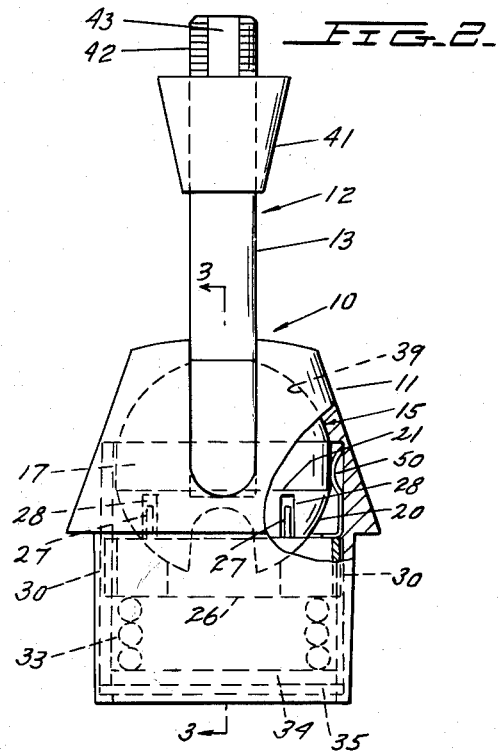
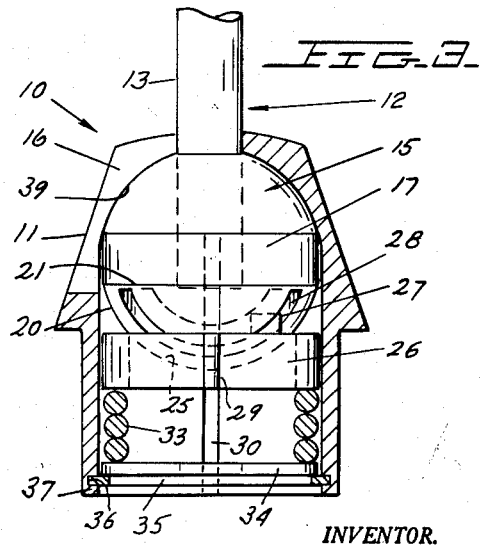
INVENTOR.
JACK J. GILBERT
BY
OSTROLENK, FABER, GERB & SOFFEN
ATTORNEYS

United States Patent Office 3,072,426
Patented Jan. 8, 1963

3,072,426
SWIVEL UNIT HAVING SPLIT BALL
Jack J. Gilbert, Suffern, N.Y., assignor to Swivelier Company, Inc., New York, N.Y., a corporation of New York
Filed Sept. 30, 1960, Ser. No. 59,761
6 Claims. (Cl. 287—91)

This invention relates to swivel units for lighting fixtures and more particularly to a swivel unit having a split nylon ball.

In recent years swivel units have been extensively utilized for lighting fixtures with the constructions of the swivel units being such that the lighting fixture is pivotable about one axis through substantially 90° and is pivotable about a second axis at right angles to the first axis for substantially 360°. This combination of pivotable movements enables the fixture to direct light over a selected portion of an extensive area.

In the use of swivel units the tendency has been to increase the mechanical load thereon because of the larger size lamps and the larger shades required for these lamps. However, it has been found that the larger loads exerted large mechanical forces which acted to displace the swivel unit from the position to which it was adjusted.

In order to overcome this difficulty the instant invention provides a swivel unit construction in which the bearing surface engaging portions of the ball are constructed of nylon. A large spring force is utilized to maintain the swivel unit in adjusted position, yet the nylon bearing surfaces enable the swivel unit position to be readily adjusted.

The utilization of nylon results in substantially silent action as the swivel unit is adjusted. In addition, nylon is a type of material which can be utilized in an inexpensive injection molding operation.

The cost of construction is materially reduced by utilizing a ball comprised of two spherical segments, each constructed of nylon, with a disk positioned between the two spherical segments. The disk is provided with an extension entered into an annular groove of one of the spherical segments for cooperation therewith in limiting rotation of the disk to substantially 360° about the second axis previously mentioned. The spherical segment is maintained against rotation about the second axis, yet is permitted to pivot about the previously mentioned first axis for substantially 90°. This is accomplished by utilizing a cup washer which provides a seat for the nylon segment with a pair of ears projecting from the seat into grooves of the spherical segment.

Accordingly, a primary object of this invention is to provide a novel construction for a lighting fixture swivel unit which is capable of withstanding heavy loads.

Another object is to provide a swivel unit of this type which is readily repositioned and will remain in the adjusted position in spite of being subjected to large mechanical loads.

Still another object is to provide a swivel unit of this type utilizing a nylon ball construction.

A further object is to provide a swivel unit of this type in which the ball comprises a pair of nylon spherical segments and a disk therebetween.

These as well as other objects of this invention shall become readily apparent after reading the following description of the accompanying drawings in which:

FIGURE 1 is an exploded perspective of the swivel unit.
FIGURE 2 is a side elevation of the swivel unit.
FIGURE 3 is a cross-section taken through line 3—3 of FIGURE 2 looking in the direction of arrows 3—3.

Now referring to the FIGURES, swivel unit unit 10 comprises a hollow elongated top shell 11 which receives the other elements of swivel unit 10. Axle assembly 12 includes hollow nipple 13 which extends through aperture 14 in upper spherical segment 15 and through elongated slot 16 in top shell 11. Disk 17 is fixedly secured to nipple 13 at the lower end thereof.

A downward projection 18 of disk 17 is disposed within annular groove 19 in the upper flat surface 21 of lower spherical segment 20. It is to be noted that groove 19 is not continuous. That is, ends 22, 23 of groove 19 are separated by raised portion 24'. This serves to limit rotation of disk 17 with respect to lower spherical segment 20 to approximately 350°.

The spherical surface 24 of segment 20 bears against the spherical surface 25 of cup washer 26. Keys 27 extending upwardly from spherical surface 25 are entered into parallel grooves 28 in spherical surface 24 to guide movement of spherical segment 20 with respect to cup washer 26. Ears 29 extending radially from washer 26 are entered into internal grooves 30 of top shell 11 so that cup washer 26 is not free to rotate within top shell 11.

Compression spring 33 is interposed between bearing plate 34 and cup washer 26, and retaining ring 35 is disposed within internal groove 36 of top shell 11 formed by the spun over edge 37 at the bottom of top shell 11. Thus, compression spring 33 forces upper spherical segment 15 against inner spherical surface 39 of top shell 11.

Threaded sleeve 41 is mounted to the threaded portion 42 at the upper end of nipple 13. Nipple 13 is also provided with a flattened surface 43 at the threaded portion thereof, to maintain swivel unit against rotation with respect to a canopy (not shown). Sleeve 41 cooperates with a securing nut (not shown) to snugly mount swivel unit 10 to the canopy. A lamp shade (not shown) and lamp receptacle (not shown) may be secured to swivel unit 10, in a well known manner, by screws entered into the threaded apertures of bearing plate 34.

In operation, nipple 13 is pivotable about a first axis comprising a horizontally disposed diameter of the sphere consisting of spherical segments 15 and 20 together with disk 17. This motion is limited to substantially 90° because of the length of slot 16. Nipple 13 is also rotatable with respect to a second axis disposed at substantially right angles to the first axis, with this rotation being limited to substantially 350° through the cooperation of projection 18 with groove 19. Ideally, this rotation would be 360°, but because of practical considerations, such as thickness 24 and the width of projection 18, the rotation is not quite 360°. Spherical segment 20 is maintained against rotation about the axis of nipple 13 through the cooperation of ears 27 and grooves 28.

All of the elements of swivel unit 10 except spherical segments 15 and 20 are constructed of metal. Segments 15 and 20 are constructed of a resinous material such as nylon and teflon (poytetrafluoroethane) but preferably nylon which can be inexpensively shaped by injection molding. With nylon segments the pivotal movements hereinbefore described may be carried out without undue exertion of force and in a quiet manner. At the same time, the bearing of the nylon surfaces against the metal surfaces insures that the swivel unit will remain in the position to which it has been adjusted.

It is noted that if the swivel unit were to be constructed merely of the elements hereinbefore described, nipple 13 would be insulated from top shell 11, hence top shell 11 would not be grounded. In order to overcome this difficulty, grounding clip 50 is provided. Clip 50 is constructed of metallic spring material and is of modified S shape with the upper bend being compressed between the peripheral edge of disk 17 and the inner surface of shell 11. The lower bend of clip 50 is somewhat straight and bears against the inner surface of shell 11. In this manner ground clip 50 provides a good electrical path between shell 11 and disk 17, which is directly connected to nipple 13.

It is to be noted that the construction hereinbefore described requires only a single biasing spring. Because of this, when the elements are being assembled, only one special jig is required for compressing a spring while metal is being deformed to retain the spring in operative position in a loaded condition. This results in speeded up, less costly production not obtainable with the teachings of the prior art.

Thus, this invention provides a novel construction for a lighting fixture swivel unit with this construction being such that extremely heavy loads may be accommodated. The construction includes the utilization of nylon bearing surfaces so that the position of the swivel unit, though readily adjustable, will not move out of position merely because of the load imposed upon the swivel unit. However, it is to be understood that the split ball and disk construction may be utilized under certain conditions without fabricating the spherical portions of nylon or a resinous material.

Although I have here described preferred embodiment of my novel invention, many variations and modifications will now be apparent to those skilled in the art, and I therefore prefer to be limited, not by the specific disclosure herein, but only by the appending claims.

I claim:

1. A swivel unit of the class described comprising a hollow shell, a first means mounted to said shell for pivotal movement about a first axis, said first means including a spherical portion disposed within said shell and a nipple extending through an elongated slot in said shell, biasing means urging said spherical portion into engagement with a spherically shaped internal surface of said shell; said spherical portion including a first and a second spherical segment and a disk sandwiched between flat surfaces of said segments; said nipple secured to said disk and extending through an aperture in said first segment positioned in alignment with said slot; said disk being mounted for rotation about a second axis disposed at right angles to said first axis; a projection and annular groove means for limiting said rotation; said projection and annular groove means being carried by said disk and one of said segments; a washer interposed between said biasing means and said second segment; means for maintaining said washer against rotation with respect to said shell; said washer having a spherical surface bearing against the spherical surface of said second segment; key means projecting from the spherical surface of the washer and entered into groove means in the spherical surface of the second segment to maintain the second segment against rotation about said second axis yet permit pivoting about said first axis.

2. A swivel unit of the class described, comprising:
   (a) a hollow shell;
   (b) a first means mounted to said shell for pivotal movement about a first axis, said first means including a spherical portion disposed within said shell and a nipple extending through an elongated slot in said shell;
      (i) said spherical portion including a first and a second spherical segment and a disc sandwiched between flat surfaces of said segments;
      (ii) said nipple secured to said disc, and extending through an aperture in said first segment positioned in alignment with said slot;
      (iii) said disc being mounted for rotation about a second axis disposed at right angles to said first axis and said disc and said second spherical segment having projection and annular groove means for limiting the rotation of said disc to approximately 350°;
   (c) biasing means urging said spherical portion into engagement with a spherically shaped internal surface of said shell;
   (d) washer interposed between said biasing means and said second segment; means for maintaining said washer against rotation with respect to said shell; said washer having a spherical surface bearing against the spherical surface of said second segment; and
   (e) key means projecting from the spherical surface of the washer and entered into groove means in the spherical surface of the second segment to maintain the second segment against rotation about said second axis yet permit pivoting about said first axis.

3. The unit as set forth in claim 2 in which the segments are constructed of a resinous material.

4. The unit as set forth in claim 2 in which the segments are constructed of nylon.

5. The unit as set forth in claim 2 in which the biasing means comprises a single compression spring.

6. The unit as set forth in claim 2 also comprising a grounding clip of metallic spring material in contact with said disk and an internal surface of said shell.

References Cited in the file of this patent

UNITED STATES PATENTS

| | | |
|---|---|---|
| 1,030,663 | Karns | June 25, 1912 |
| 2,755,116 | Alldredge | July 17, 1956 |
| 2,935,348 | Jones | May 3, 1960 |